US012503898B1

(12) United States Patent
Chen

(10) Patent No.: US 12,503,898 B1
(45) Date of Patent: Dec. 23, 2025

(54) HINGE DEVICE

(71) Applicant: SHANGHAI TENDENCY INDUSTRIAL CO., LTD, Shanghai (CN)

(72) Inventor: Zhuo Chen, Anhui (CN)

(73) Assignee: SHANGHAI TENDENCY INDUSTRIAL CO., LTD, Shanghai (CN)

( * ) Notice: Subject to any disclaimer, the term of this patent is extended or adjusted under 35 U.S.C. 154(b) by 0 days.

(21) Appl. No.: 19/065,340

(22) Filed: Feb. 27, 2025

(30) Foreign Application Priority Data

Feb. 13, 2025 (CN) ........................ 202520228742.3

(51) Int. Cl.

*E05D 11/04* (2006.01)
*E05D 3/02* (2006.01)
*E05D 11/00* (2006.01)
*F16C 11/04* (2006.01)

(52) U.S. Cl.

CPC ................ *E05D 11/00* (2013.01); *E05D 3/02* (2013.01); *F16C 11/04* (2013.01); *E05Y 2201/628* (2013.01)

(58) Field of Classification Search

CPC ........... E05D 3/02; E05D 11/00; E05D 11/02; E05D 11/04; E05D 2011/045; E05D 5/16; E05Y 2201/628; E05Y 2201/632; E05Y 2800/422; E05Y 2800/412; E05Y 2900/132; F16C 11/04

See application file for complete search history.

(56) References Cited

U.S. PATENT DOCUMENTS 1,435,907 A * 11/1922 Howard .................. E05D 11/04 16/276
1,599,258 A * 9/1926 Way ........................ E05D 11/04 16/276
1,639,633 A * 8/1927 Raymond ............... E05D 11/04 16/276
1,738,015 A * 12/1929 Parsons .................. E05D 11/04 16/385

(Continued)

FOREIGN PATENT DOCUMENTS

CN 102287104 A 12/2011
CN 207728186 U 8/2018

(Continued)

*Primary Examiner* — Chuck Y Mah
(74) *Attorney, Agent, or Firm* — Nitin Kaushik

(57) ABSTRACT

Provided in the present utility model is a hinge device, including a first hinge leaf provided with first shaft sleeves, a second hinge leaf provided with second shaft sleeves, a rotating shaft, and flanged bearings, where both the first shaft sleeves and the second shaft sleeves are sleeved on the rotating shaft, each flanged bearing includes a bearing body and a housing in which the bearing body is disposed, the housing is further provided with a connecting portion, and the connecting portions are fixedly connected to either the first shaft sleeves or the second shaft sleeves. According to the hinge device, relative rotation between the first hinge leaf and the second hinge leaf is improved by the flanged bearings, so that the flanged bearings can be removed together with the first hinge leaf or the second hinge leaf, thus avoiding the risk that the flanged bearings fall off.

4 Claims, 5 Drawing Sheets

(56) References Cited

U.S. PATENT DOCUMENTS

| | | | | | |
|---|---|---|---|---|---|
| RE17,748 | E * | 7/1930 | Kimball | E05D 11/04 | 29/11 |
| 1,800,238 | A * | 4/1931 | Woernle | E05D 11/04 | 16/276 |
| 1,873,566 | A * | 8/1932 | Ferris | E05D 11/04 | 16/276 |
| 2,000,856 | A * | 5/1935 | Lyons | E05D 5/04 | 16/276 |
| 2,010,659 | A * | 8/1935 | Ferris | E05D 11/04 | 16/276 |
| 2,214,348 | A * | 9/1940 | Roth | E05D 5/10 | 16/274 |
| 3,118,171 | A * | 1/1964 | Parsons | E05D 11/04 | 16/276 |
| 3,152,356 | A * | 10/1964 | Parsons | E05D 5/127 | 16/259 |
| 3,465,380 | A * | 9/1969 | Foltz | E05D 11/04 | 16/276 |
| 4,097,959 | A * | 7/1978 | Johnson | E05D 11/04 | 16/276 |
| 5,463,795 | A * | 11/1995 | Carlson | E05D 11/00 | 16/385 |
| 6,173,475 | B1 * | 1/2001 | Senn | E05D 5/14 | 16/385 |
| 7,290,310 | B2 * | 11/2007 | Yamaguchi | E05D 5/10 | 16/234 |
| 8,191,205 | B2 * | 6/2012 | Forrest | E05D 11/06 | 16/386 |
| 2013/0104341 | A1 * | 5/2013 | Kenerly | E05D 5/16 | 16/273 |

FOREIGN PATENT DOCUMENTS

| | | | | |
|---|---|---|---|---|
| CN | 208482799 U | | 2/2019 | |
| DE | 19912335 C2 | * | 2/2001 | E05D 11/0081 |

* cited by examiner

HINGE DEVICE

CROSS-REFERENCE TO RELATED APPLICATIONS

The application claims priority to Chinese patent application No. 2025202287423, filed on Feb. 13, 2025, the entire contents of which are incorporated herein by reference.

FIELD OF TECHNOLOGY

The present utility model relates to the technical field of hinges, in particular to a hinge device.

BACKGROUND

Hinges, as rather common connecting components in daily life, are widely used between doors, windows, and numerous structures that require relative rotation. A conventional hinge mainly includes a hinge leaf and a rotating shaft. The hinge leaf is sleeved on the rotating shaft to achieve rotation of the hinge leaf However, the hinge in the prior art has a relatively simple structure and cannot meet the usage requirements of some special occasions. For example, on some doors or windows that need to be opened and closed frequently, conventional hinges have relatively short service life and are prone to loosening, noise, and the like.

On this basis, the hinge is improved by adding bearings to the hinge, thereby improving relative rotation between the hinge leaf and the rotating shaft, and making rotation of the hinge leaf smoother. During use, the bearings need to be sleeved on the rotating shaft, so that the bearings are rotatable relative to the rotating shaft. Thus, when the hinge is damaged and needs to be disassembled for inspection and repair, as the hinge leaf separates, the bearings are likely to slip off the rotating shaft, resulting in a risk of loss. Even if the bearings are not lost, the bearings that fall off may be damaged, thus increasing repair costs.

SUMMARY

The present utility model provides a hinge device to solve the problem in the prior art that bearings are likely to fall off during repair of a hinge.

The present utility model provides a hinge device, including a first hinge leaf, a second hinge leaf, and a rotating shaft, where the first hinge leaf is provided with first shaft sleeves, the second hinge leaf is provided with second shaft sleeves, and both the first shaft sleeves and the second shaft sleeves are sleeved on the rotating shaft. The hinge device further includes flanged bearings, where each of the flanged bearings includes a bearing body and a housing, the bearing body is disposed in the housing, the housing is further provided with a connecting portion, the connecting portions are fixedly connected to either the first shaft sleeves or the second shaft sleeves, and both the bearing bodies and the connecting portions are sleeved on the rotating shaft.

According to the hinge device provided by the present utility model, the hinge device includes a plurality of flanged bearings, where each of the flanged bearings is connected to the corresponding first shaft sleeve or the corresponding second shaft sleeve, and the first shaft sleeves and the second shaft sleeves abut against each other by the flanged bearings.

According to the hinge device provided by the present utility model, the flanged bearings are integrally formed with the first shaft sleeves or the flanged bearings are integrally formed with the second shaft sleeves.

According to the hinge device provided by the present utility model, the connecting portions are embedded into the first shaft sleeves or the second shaft sleeves, so as to be fixedly connected to the first shaft sleeves or the second shaft sleeves.

According to the hinge device provided by the present utility model, the outer diameter of the connecting portions gradually decreases along an embedding direction of the connecting portions.

According to the hinge device provided by the present utility model, each of the bearing bodies includes an upper cover plate, a lower cover plate, and a plurality of steel balls, where the upper cover plate and the lower cover plate are arranged opposite to each other, a first groove is formed in one surface of the upper cover plate facing the lower cover plate, a second groove is formed in one surface of the lower cover plate facing the upper cover plate, and the plurality of steel balls are disposed between the upper cover plate and the lower cover plate, and roll along the first groove and the second groove.

According to the hinge device provided by the present utility model, the maximum depth of the first groove and the second groove is equal to one-third of the diameter of each of the steel balls.

According to the hinge device provided by the present utility model, a spacing between the upper cover plate and the lower cover plate is equal to one-third of the diameter of each of the steel balls.

According to the hinge device provided by the present utility model, the upper cover plate is disposed on one side in the housing away from the connecting portion, the housing semi-wraps the upper cover plate, and a top surface of the upper cover plate is higher than a top surface of the housing.

According to the hinge device provided by the present utility model, the connecting portions are in interference fit with the first shaft sleeves or the connecting portions are in interference fit with the second shaft sleeves.

The hinge device provided by the present utility model includes the first hinge leaf, the second hinge leaf, the rotating shaft, and the flanged bearings. Both the first hinge leaf and the second hinge leaf are sleeved on the rotating shaft, so that both the first hinge leaf and the second hinge leaf are rotatable relative to the rotating shaft. Meanwhile, the flanged bearings are further added in the present application. The flanged bearings are connected to the first hinge leaf or the second hinge leaf, so that the first hinge leaf and the second hinge leaf rotate relative to each other by the flanged bearings, thus improving rotation between the first hinge leaf and the second hinge leaf Moreover, the flanged bearings are fixedly connected, thereby avoiding the situation where the flanged bearings fall off.

BRIEF DESCRIPTION OF THE DRAWINGS

To more clearly illustrate the technical solutions in the embodiments of the present utility model or in the prior art, the accompanying drawings that need to be used in the description of the embodiments or the prior art will be briefly introduced below. Apparently, the accompanying drawings in the description below illustrate some embodiments of the present utility model. Those of ordinary skill in the art can also derive other accompanying drawings from these accompanying drawings without creative efforts.

Figure 1:
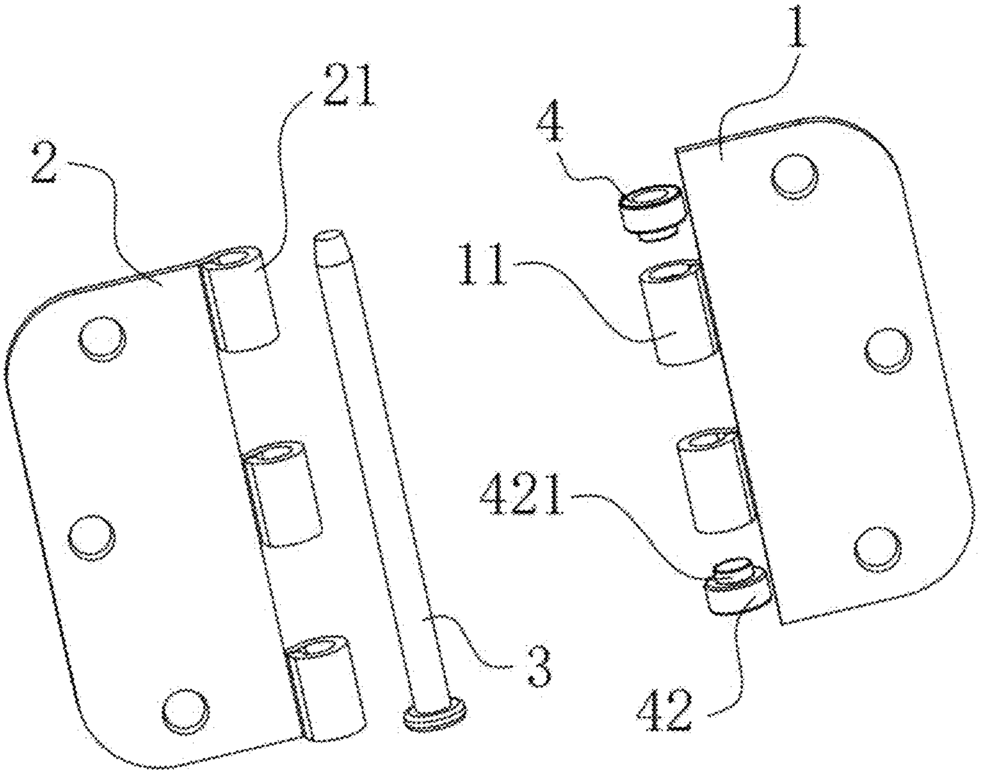
FIG. 1 is an exploded view of a hinge device provided by the present utility model.

Reference signs are as follows:

1. first hinge leaf; 11. first shaft sleeve;
2. second hinge leaf; 21. second shaft sleeve;
3. rotating shaft;
4. flanged bearing; 41. bearing body; 411. upper cover plate; 412. lower cover plate; 413. steel ball; 414. first groove; 415. second groove; 42. housing; and 421. connecting portion.

DETAILED DESCRIPTION OF THE EMBODIMENTS

To make the objectives, technical solutions and advantages of the present utility model clearer, the technical solutions in the present utility model will be clearly and completely described below with reference to the accompanying drawings in the present utility model. Apparently, the described embodiments are some rather than all of the embodiments of the present utility model. All other embodiments obtained by those of ordinary skill in the art based on the embodiments in the present utility model without creative efforts shall fall within the scope of protection of the present utility model.

A hinge device of the present utility model will be described below with reference to FIG. 1. The hinge device includes a first hinge leaf 1, a second hinge leaf 2, and a rotating shaft 3. The first hinge leaf 1 is provided with first shaft sleeves 11, the second hinge leaf 2 is provided with second shaft sleeves 21, and both the first shaft sleeves 11 and the second shaft sleeves 21 are sleeved on the rotating shaft 3. The hinge device further includes flanged bearings 4, where each flanged bearing 4 includes a bearing body 41 and a housing 42, the bearing body 41 is disposed in the housing 42, the housing 42 is further provided with a connecting portion 421, the connecting portions 421 are fixedly connected to either the first shaft sleeves 11 or the second shaft sleeves 21, and both the bearing bodies 41 and the connecting portions 421 are sleeved on the rotating shaft 3.

Figure 2:
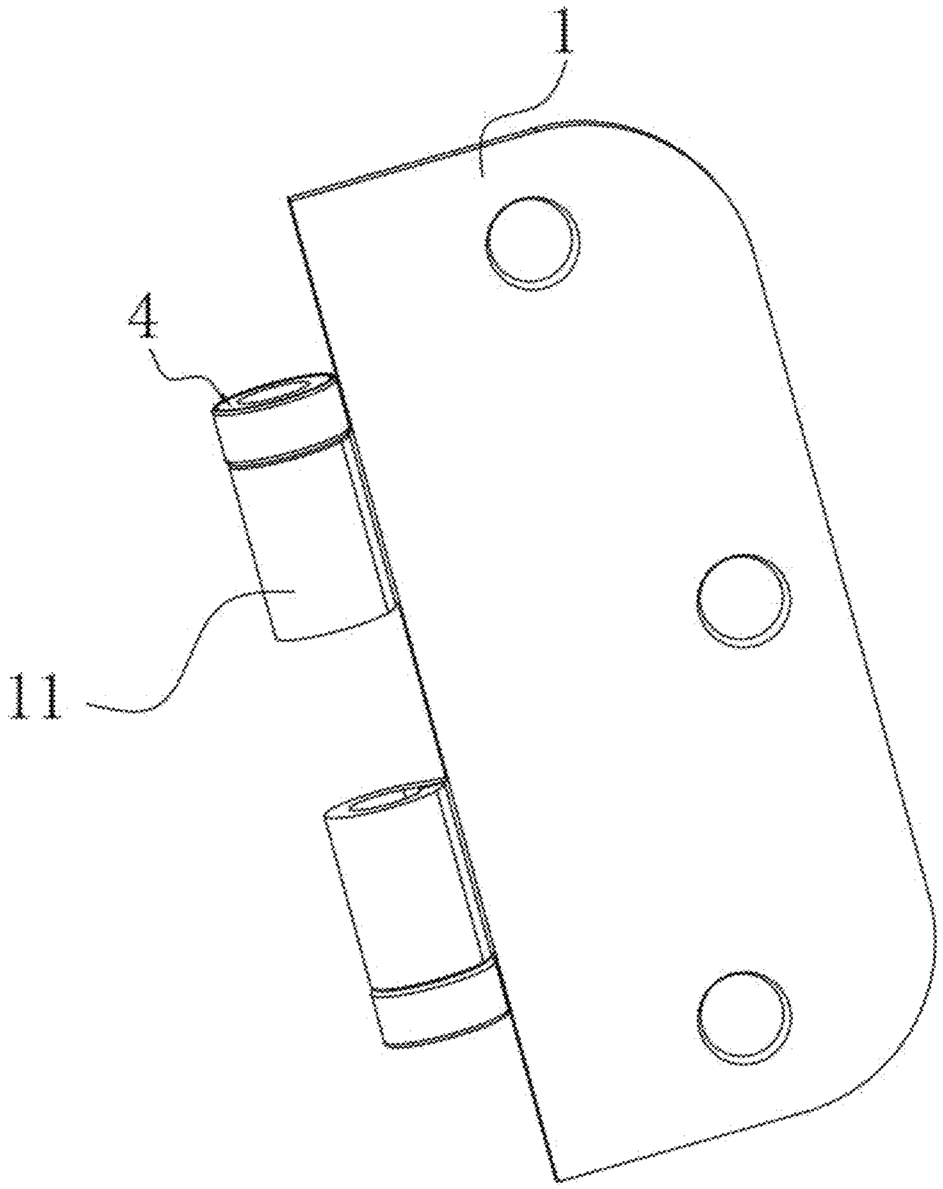
FIG. 2 is a schematic structural diagram of a first hinge leaf provided in the present utility model.
Figure 3:
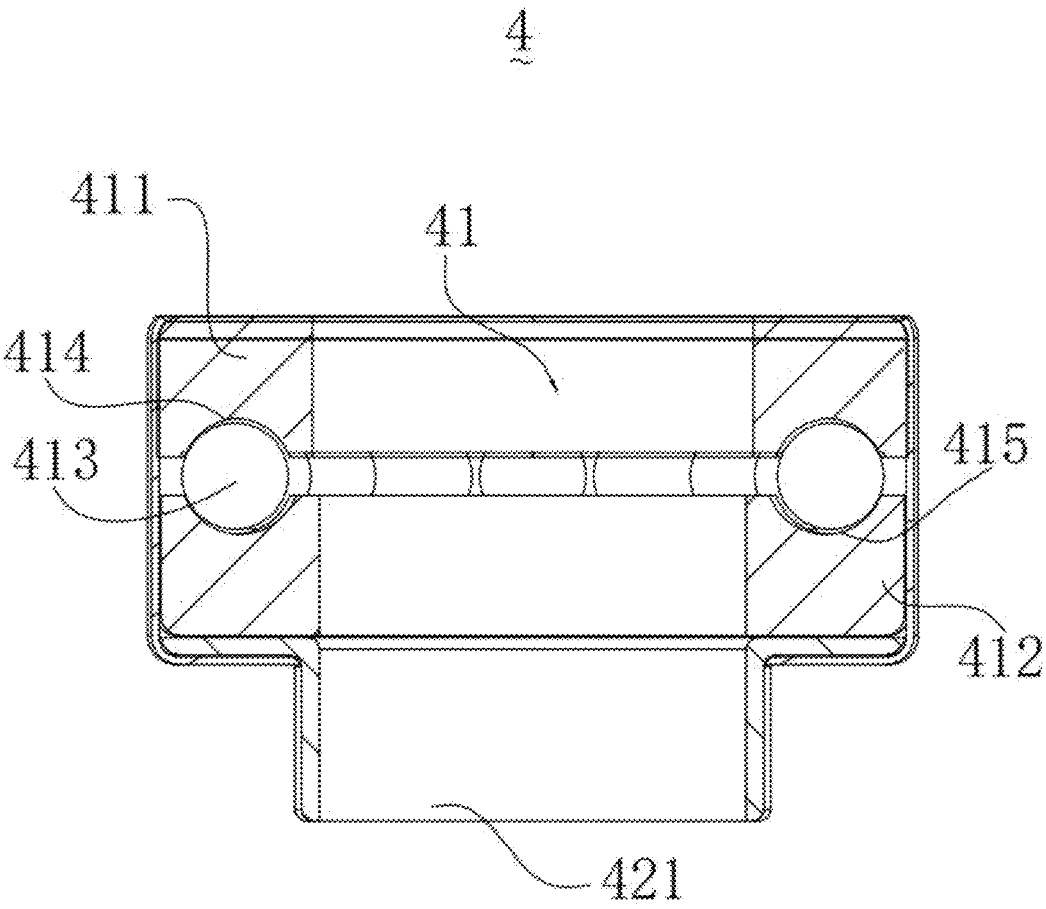
FIG. 3 is a sectional view of a flanged bearing provided in the present utility model.

Referring to FIG. 1 to FIG. 3 together, in this embodiment, there is provided an example where the first hinge leaf 1 is provided with two first shaft sleeves 11 and the second hinge leaf 2 is provided with three second shaft sleeves 21. The three second shaft sleeves 21 on the second hinge leaf 2 are disposed on a same edge of the second hinge leaf 2 and are arranged at intervals. So there are two gaps in total between the three second shaft sleeves 21. In this case, the two first shaft sleeves 11 on the first hinge leaf 1 are exactly aligned with and inserted into the two gaps between the three second shaft sleeves 21, so that center lines of the first shaft sleeves 11 and the second shaft sleeves 21 are aligned in a straight line. Then, a center line of the rotating shaft 3 is aligned with the centers of the first shaft sleeves 11 and the second shaft sleeves 21, so that the rotating shaft 3 can pass through the first shaft sleeves 11 and the second shaft sleeves 21.

When the first hinge leaf 1 is sleeved on the rotating shaft 3 through the first shaft sleeves 11 and the second hinge leaf 2 is sleeved on the rotating shaft 3 through the second shaft sleeves 21, the first hinge leaf 1 and the second hinge leaf 2 are rotatable relative to each other. However, when the first hinge leaf 1 and the second hinge leaf 2 rotate relative to each other, there is a large frictional force between the first hinge leaf 1 and the second hinge leaf 2, and large wear will occur between them, thus shortening the service life.

Therefore, in the present application, the flanged bearings 4 are further included. When the flanged bearings 4 are mounted on either the first hinge leaf 1 or the second hinge leaf 2, the first hinge leaf 1 and the second hinge leaf 2 are rotatable relative to each other by the flanged bearings 4, so that relative rotation is made smoother, and the frictional force is reduced, thus prolonging the service life. As shown in FIG. 2, in this embodiment, a description is given by taking an example where the flanged bearings 4 are mounted on the first hinge leaf 1. In a different embodiment, the flanged bearings 4 can also be mounted on the second hinge leaf 2, which is not limited herein. Referring to FIG. 1 and FIG. 2 together, since the first hinge leaf 1 is sleeved on the rotating shaft 3 through the first shaft sleeves 11 and can thus rotate relatively, the flanged bearings 4 are mounted on the first shaft sleeves 11.

After the flanged bearings 4 are mounted, the first hinge leaf 1 abuts against the second hinge leaf 2 by the flanged bearings 4. Compared with sliding friction generated by direct contact between the first hinge leaf 1 and the second hinge leaf 2 in the past, the flanged bearings 4 can transform relative rotation between the first hinge leaf 1 and the second hinge leaf 2 into rolling friction, thereby reducing the friction coefficient, and achieving the effects of reducing the frictional force and prolonging the service life.

Figure 4:
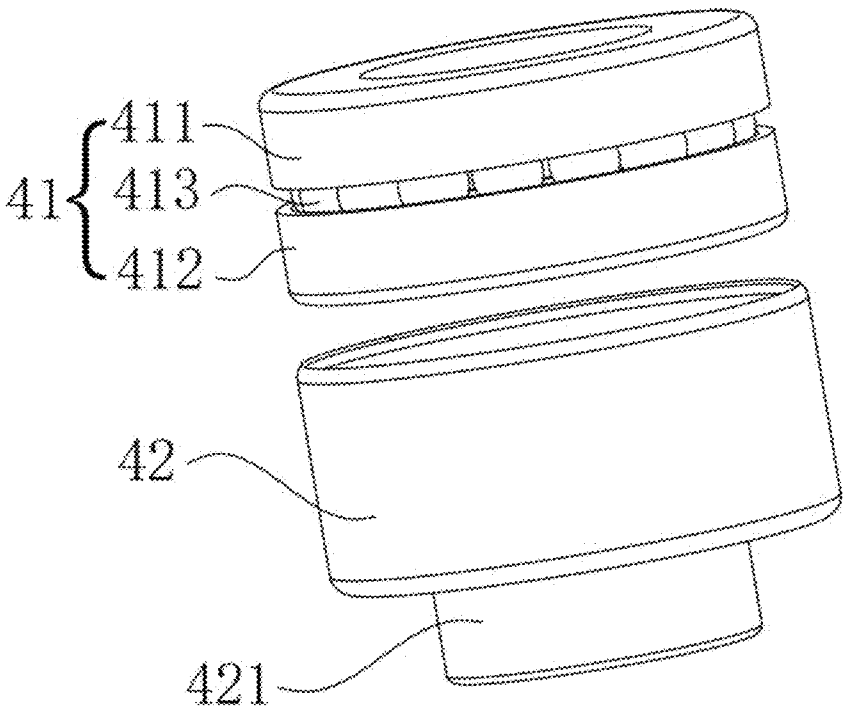
FIG. 4 is an exploded view of a flanged bearing provided in the present utility model.
Figure 5:
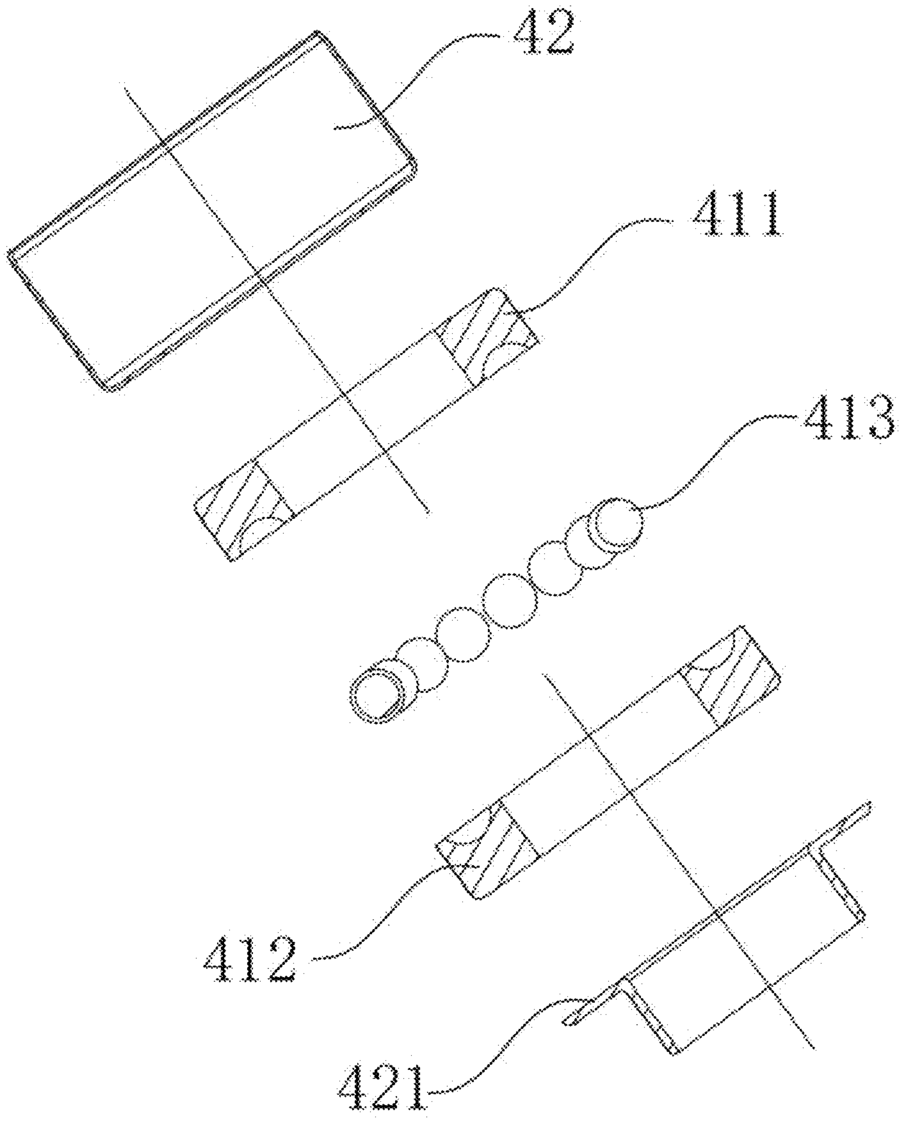
FIG. 5 is an exploded sectional view of a flanged bearing provided in the present utility model.

As shown in FIG. 3 to FIG. 5, each flanged bearing 4 includes a bearing body 41 and a housing 42. The bearing body 41 is disposed in the housing 42, so that the housing 42 can protect the bearing body 41. Since the bearing body 41 needs to rotate relatively, there is a sufficient gap between the housing 42 and the bearing body 41 to allow the bearing body 41 to rotate, thus avoiding relative friction between the bearing body 41 and an inner wall of the housing 42.

Since the housing 42 needs to wrap the bearing body 41, the housing 42 is preferably in the shape of a circular tube. Along an axial direction of the housing 42, one end of the housing 42 is provided with a connecting portion 421. The housing 42 is connected to the first shaft sleeve 11 by the connecting portion 421. The connection between the connecting portion 421 and the housing 42 includes a fixed connection or a relative rotation connection. However, regardless of the connection between the connecting portion 421 and the housing 42, the connecting portion 421 will not fall out of the housing 42. When the connection between the connecting portion 421 and the housing 42 is the fixed connection, there is no risk that the connecting portion 421 falls off from the housing 42, and the connecting portion 421 will drive the housing 42 to rotate relative to the bearing body 41 together. When the connection between the connecting portion 421 and the housing 42 is the relative rotation connection, the connecting portion 421 will not drive the housing 42 to rotate after rotating relatively. In this case, the connecting portion 421 needs to remain relatively fixed with a rotating portion in the bearing body 41 so that the connecting portion 421 can rotate relatively along with the bearing body 41. Since the bearing body 41 is disposed in the housing 42 and the bearing body 41 will not fall out of the housing 42, the connecting portion 421 will also not fall out of the housing 42. Thus, the bearing body 41, the housing 42, and the connecting portion 421 are integrated and will not separate.

In this case, after the connecting portion 421 is fixedly connected to the first shaft sleeve 11, the entire flanged bearing 4 can be fixedly connected to the first shaft sleeve 11. Since the first shaft sleeves 11 are fixedly connected to the first hinge leaf 1, the flanged bearings 4 are fixedly connected to the first hinge leaf 1, so that the flanged bearings 4 can be prevented from falling off.

When the hinge device is damaged and needs to be disassembled for inspection and repair, the first hinge leaf 1 and the second hinge leaf 2 need to be removed from the rotating shaft 3. Because the flanged bearings 4 are fixedly connected to the first hinge leaf 1, when the first hinge leaf 1 is removed from the rotating shaft 3, the flanged bearings 4 can be removed along with the first hinge leaf 1. Since the first hinge leaf 1 is large in overall size, the first hinge leaf 1 is convenient to take during disassembly and has a low risk of falling. Thus, the risk of falling of the flanged bearings 4 fixedly connected to the first hinge leaf 1 is reduced, thereby extending the service life of the flanged bearings 4.

Because the bearings used in a hinge is small-sized precision parts, during disassembly of the ordinary hinge, it is inconvenient to take the small-sized bearings, thus significantly increasing the risk of falling. Moreover, due to small size of the bearings, it is more difficult to find the bearings after they falls. Even if the bearings that fall off can be found, they may be damaged due to collision after falling, which affects normal use of the bearings. Therefore, falling of the bearings brings a poor usage experience to a user.

In the present application, the entire flanged bearings 4 are fixedly connected to the first shaft sleeves 11 by the connecting portions 421, thereby reducing the risk of falling of the flanged bearings 4, extending the service life of the flanged bearings 4, and improving the usage experience of the user.

In an embodiment, the hinge device includes a plurality of flanged bearings 4, where each flanged bearing 4 is connected to the corresponding first shaft sleeve 11 or the corresponding second shaft sleeve 21, and the first shaft sleeves 11 and the second shaft sleeves 21 abut against each other by the flanged bearings 4.

In this embodiment, since there are two first shaft sleeves 11 and three second shaft sleeves 21 in total, there are a total of four abutting surfaces between the first shaft sleeves 11 and the second shaft sleeves 21. Preferably, four flanged bearings 4 can be selected, so that the abutting surfaces between the first shaft sleeves 11 and the second shaft sleeves 21 abut against one another through the flanged bearings 4. As shown in FIG. 1, in this embodiment, a description is given by taking two flanged bearings 4 as an example. The two flanged bearings 4 are correspondingly connected to the two first shaft sleeves 11 respectively, and along an axial direction of the rotating shaft 3, the two flanged bearings 4 are disposed at two ends respectively. One flanged bearing 4 is disposed at an upper end part of the upper first shaft sleeve 11, and the other flanged bearing 4 is disposed at a lower end part of the lower first shaft sleeve 11. The two flanged bearings 4 are symmetrically arranged, which can make the flanged bearings 4 bear force more evenly, thus avoiding stress concentration.

In an embodiment, the flanged bearings 4 are integrally formed with the first shaft sleeves 11 or the flanged bearings 4 are integrally formed with the second shaft sleeves 21.

In this embodiment, there is provided an example where the flanged bearings 4 are integrally formed with the first shaft sleeves 11. During production, the flanged bearings 4 and the first shaft sleeves 11 are designed to be integrally formed, so that the first hinge leaf 1 carries the flanged bearings 4 after leaving the factory. Moreover, since the flanged bearings 4 are fixedly connected to the first hinge leaf 1, the flanged bearings 4 can be prevented from falling off. Thus, during assembly of the first hinge leaf 1, the second hinge leaf 2, and the rotating shaft 3, the step of connecting the flanged bearings 4 to the first hinge leaf 1 can be omitted, and the flanged bearings 4 can be prevented from falling off. This not only improves the assembly efficiency, but also increases the yield of the finished hinge device.

In an embodiment, the connecting portions 421 are embedded into the first shaft sleeves 11 or the second shaft sleeves 21, so as to be fixedly connected to the first shaft sleeves 11 or the second shaft sleeves 21.

Referring to FIG. 1 to FIG. 3 together, in this embodiment, there is provided an example where the connecting portions 421 are embedded into the first shaft sleeves 11. Since the connecting portions 421 need to be embedded into the first shaft sleeves 11, the connecting portions 421 are in the shape of a circular tube, and the outer diameter of the connecting portions 421 corresponds to the inner diameter of the first shaft sleeves 11. Embedding the connecting portions 421 into the first shaft sleeve 11 can make the connection between the connecting portions 421 and the first shaft sleeves 11 more stable. Meanwhile, after the connecting portions 421 are embedded into the first shaft sleeves 11, the connecting portions 421 contact inner wall surfaces of the first shaft sleeves 11 through outer wall surfaces, which can also increase the contact area. Thus, when the connecting portions 421 bear a tangential force, the pressure intensity can be reduced, and the overall structural strength can be improved.

In this embodiment, connecting the connecting portions 421 by means of embedding can improve the overall structural strength. In a different embodiment, when the requirement for structural strength is not high, the connecting portions 421 can also be directly connected to end surfaces of the first shaft sleeves 11, so as to reduce the length of the connecting portions 421 and save materials.

In an embodiment, the connecting portions 421 are in interference fit with the first shaft sleeves 11 or the connecting portions 421 are in interference fit with the second shaft sleeves 21.

Referring to FIG. 1 and FIG. 2 together, after the connecting portions 421 are embedded into the first shaft sleeves 11, the connecting portions 421 are in interference fit with the first shaft sleeves 11, so that after the connecting portions 421 are embedded into the first shaft sleeves 11, the connecting portions 421 and the first shaft sleeves 11 remain relatively fixed through mutual extrusion between them. Meanwhile, since the connecting portions 421 and the first shaft sleeves 11 remain relatively fixed by means of interference fit, the connecting portions 421 can also be removed from the first shaft sleeves 11. Therefore, the fixed connection between the connecting portions 421 and the first shaft sleeves 11 means that the connecting portions 421 and the first shaft sleeves 11 remain relatively fixed when in use. In the case of disassembly and repair, the connecting portions 421 can also be removed, so that when the flanged bearings 4 are damaged, the flanged bearings 4 can be removed for repair and replacement without replacing the entire first hinge leaf 1, thus saving costs.

In a different embodiment, a different connection can also be used. For example, after the connecting portions 421 are embedded into the first shaft sleeves 11, the connecting portions 421 are fixedly connected to the first shaft sleeves 11 by using an adhesive due to a large contact area between the connecting portions 421 and the first shaft sleeves 11.

Further, the connection between the connecting portions 421 and the first shaft sleeves 11 further includes welding and the like, which will not be repeated one by one herein.

In an embodiment, the outer diameter of the connecting portions 421 gradually decreases along an embedding direction of the connecting portions 421. As shown in FIG. 3, an end part of one side of each connecting portion 421 away from the corresponding bearing body 41 is an entry end, so the outer diameter of the connecting portions 421 gradually decreases along the embedding direction of the connecting portions 421, that is, the outer diameter of the entry ends is minimum. In this embodiment, it is only necessary to chamfer the entry ends of the connecting portions 421. Since the connecting portions 421 need to be embedded into the first shaft sleeves 11, the outer diameter of the entry ends is minimum, which can enable the connecting portions 421 to be embedded into the first shaft sleeves 11 more smoothly.

Further, when the connecting portions 421 are in interference fit with the first shaft sleeves 11, chamfering the entry ends of the connecting portions 421 can enable the entry ends of the connecting portions 421 to enter the first shaft sleeves 11 first and then drive the whole connecting portions to be embedded into the first shaft sleeves 11. In this embodiment, minimizing the outer diameter of the entry ends of the connecting portions 421 can make it more convenient for embedding of the connecting portions 421.

In an embodiment, each bearing body 41 includes an upper cover plate 411, a lower cover plate 412, and a plurality of steel balls 413, where the upper cover plate 411 and the lower cover plate 412 are arranged opposite to each other, a first groove 414 is formed in one surface of the upper cover plate 411 facing the lower cover plate 412, a second groove 415 is formed in one surface of the lower cover plate 412 facing the upper cover plate 411, and the plurality of steel balls 413 are disposed between the upper cover plate 411 and the lower cover plate 412, and roll along the first groove 414 and the second groove 415.

As shown in FIG. 3, in the present application, it is required that the bearing body 41 can be divided into an upper part and a lower part along the axial direction of the rotating shaft 3 for relative rotation, which is different from a conventional bearing that is divided into an inner ring and an outer ring for relative rotation. So each bearing body 41 in the present application includes the upper cover plate 411, the lower cover plate 412, and the plurality of steel balls 413. The plurality of steel balls 413 are disposed between the upper cover plate 411 and the lower cover plate 412, so that the upper cover plate 411 and the lower cover plate 412 are rotatable relative to each other.

Moreover, a first groove 414 and a second groove 415 are formed in the upper cover plate 411 and the lower cover plate 412 respectively, so that the steel balls 413 can roll more smoothly, thus achieving the effect of reducing noise. In this embodiment, the connecting portion 421 is disposed on one side of the lower cover plate 412, and the connecting portion 421 is fixedly connected to the first shaft sleeve 11, so the first shaft sleeve 11 rotates through the lower cover plate 412. Thus, the upper cover plate 411 abuts against the second shaft sleeve 21, and the second shaft sleeve 21 rotates through the upper cover plate 411.

When the first hinge leaf 1 and the second hinge leaf 2 rotate relative to each other, they rotate relative to each other through the upper cover plate 411 and the lower cover plate 412 respectively. Since the steel balls 413 are disposed between the upper cover plate 411 and the lower cover plate 412, the relative rotation is carried out by rolling of the steel balls 413, thus achieving the effects of reducing the frictional force and lowering noise.

In an embodiment, the maximum depth of the first groove 414 and the second groove 415 is equal to one-third of the diameter of the steel balls 413. In an embodiment, a spacing between the upper cover plate 411 and the lower cover plate 412 is equal to one-third of the diameter of the steel balls 413.

In this embodiment, taking one-third of the diameter of the steel balls 413 as an example, it is ensured that the steel balls 413 can roll smoothly in the first groove 414 and the second groove 415, and it is also ensured that the steel balls 413 can be prevented from falling off. Meanwhile, a sufficient gap is reserved between the upper cover plate 411 and the lower cover plate 412 to allow entry of a lubricating fluid, which can further reduce the frictional force.

In an embodiment, the upper cover plate 411 is disposed on one side in the housing 42 away from the connecting portion 421, the housing 42 semi-wraps the upper cover plate 411, and a top surface of the upper cover plate 411 is higher than a top surface of the housing 42.

Referring to FIG. 1 to FIG. 3, in this embodiment, since the upper cover plate 411 abuts against the second shaft sleeve 21, the housing 42 is designed to semi-wrap the upper cover plate 411, thus preventing the housing 42 from abutting against the second shaft sleeve 21. Because the second shaft sleeve 21 needs to rotate, if the housing 42 abuts against the second shaft sleeve 21, friction will occur between the housing 42 and the second shaft sleeve 21, resulting in wear of the housing 42 and the second shaft sleeve 21, which affects the service life. Therefore, in this embodiment, the design in which the housing 42 semi-wraps the upper cover plate 411 and the top surface of the upper cover plate 411 is higher than the top surface of the housing 42 can avoid the wear between the housing 42 and the second shaft sleeve 21, thus extending the service life.

Finally, it should be noted that the above embodiments are only used to illustrate the technical solutions of the present utility model, but not to limit them; while the present utility model has been described in detail with reference to the aforementioned embodiments, those of ordinary skill in the art should understand that they can still make modifications on the technical solutions described in the aforementioned embodiments or make equivalent replacements on some of the technical features; and these modifications or replacements do not make the essences of the corresponding technical solutions deviate from the spirits and scopes of the technical solutions of the various embodiments of the present utility model.

What is claimed is:

1. A hinge device, comprising a first hinge leaf (1), a second hinge leaf (2), and a rotating shaft (3), the first hinge leaf (1) being provided with first shaft sleeves (11), the second hinge leaf (2) being provided with second shaft sleeves (21), and both the first shaft sleeves (11) and the second shaft sleeves (21) being sleeved on the rotating shaft (3), wherein the hinge device further comprises flanged bearings (4), each of the flanged bearings (4) comprises a bearing body (41) and a housing (42), the bearing body (41) is disposed in the housing (42), the housing (42) is further provided with a connecting portion (421), the connecting portions (421) are fixedly connected to either the first shaft sleeves (11) or the second shaft sleeves (21), and both the bearing bodies (41) and the connecting portions (421) are sleeved on the rotating shaft (3);

wherein the hinge device comprises a plurality of flanged bearings (4), each of the flanged bearings (4) is connected to the corresponding first shaft sleeve (11) or the corresponding second shaft sleeve (21), and the first shaft sleeves (11) and the second shaft sleeves (21) abut against each other by the flanged bearings (4); and the flanged bearings (4) are integrally formed with the first shaft sleeves (11) or the flanged bearings (4) is integrally formed with the second shaft sleeves (21); and wherein the connecting portions (421) are embedded into the first shaft sleeves (11) or the second shaft sleeves (21), so as to be fixedly connected to the first shaft sleeves (11) or the second shaft sleeves (21);

wherein each of the bearing bodies (41) comprises an upper cover plate (411), a lower cover plate (412), and a plurality of steel balls (413), the upper cover plate (411) and the lower cover plate (412) are arranged opposite to each other, a first groove (414) is formed in one surface of the upper cover plate (411) facing the lower cover plate (412), a second groove (415) is formed in one surface of the lower cover plate (412) facing the upper cover plate (411), and the plurality of steel balls (413) are disposed between the upper cover plate (411) and the lower cover plate (412), and roll along the first groove (414) and the second groove (415);

wherein the outer diameter of the connecting portions (421) gradually decreases along an embedding direction of the connecting portions (421);

wherein the upper cover plate (411) is disposed on one side in the housing (42) away from the connecting portion (421), the housing (42) semi-wraps the upper cover plate (411), and a top surface of the upper cover plate (411) is higher than a top surface of the housing (42).

2. The hinge device according to claim 1, wherein the maximum depth of the first groove (414) and the second groove (415) is equal to one-third of the diameter of the steel balls (413).

3. The hinge device according to claim 1, wherein a spacing between the upper cover plate (411) and the lower cover plate (412) is equal to one-third of the diameter of the steel balls (413).

4. The hinge device according to claim 1, wherein the connecting portions (421) are in interference fit with the first shaft sleeves (11) or the connecting portions (421) are in interference fit with the second shaft sleeves (21).

* * * * *